(No Model.)
A. THIOLLIER.
PROCESS OF AND APPARATUS FOR EXTRACTING METALS FROM THEIR ORES.
No. 272,391. Patented Feb. 13, 1883.
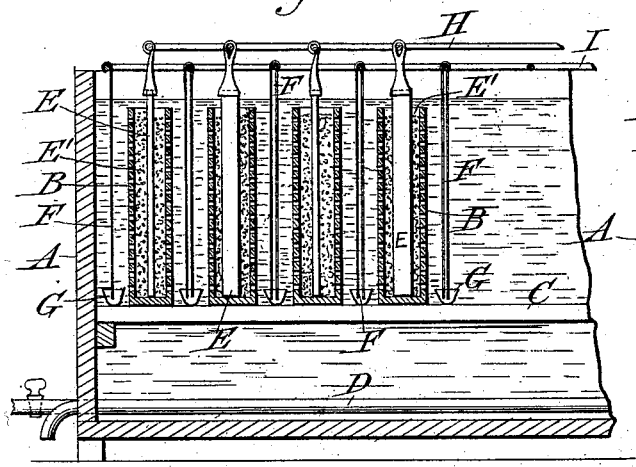
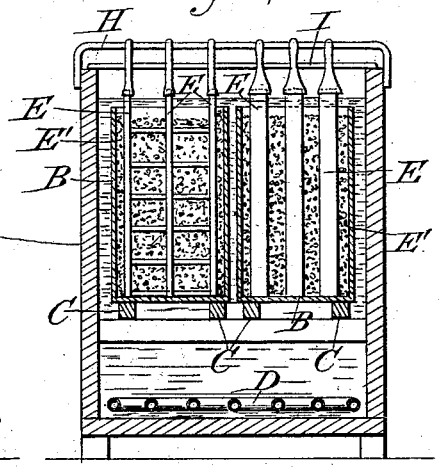
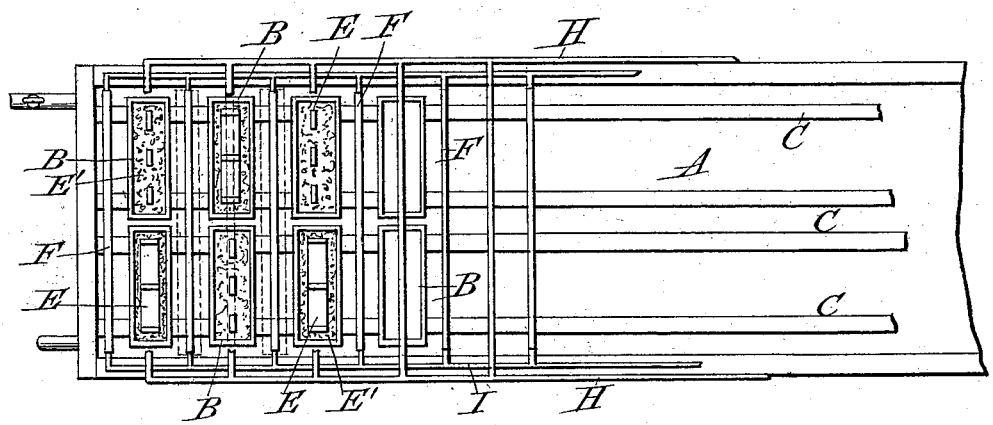
Attest:
F. H. Schott
Philip Mauro
Inventor:
Antonin Thiollier
by A. Pollok his attorney

UNITED STATES PATENT OFFICE.

ANTONIN THIOLLIER, OF VILLEBOEUF DE ROCHE LA MOLIERE, ASSIGNOR OF ONE-HALF TO ALBERT ANCEL, OF CHATEAU DE BOUCHES D'UZURE, CANTON DE CRAON, MAYENNE, FRANCE.

PROCESS OF AND APPARATUS FOR EXTRACTING METALS FROM THEIR ORES.

SPECIFICATION forming part of Letters Patent No. 272,391, dated February 13, 1883.

Application filed October 5, 1882. (No model.)

*To all whom it may concern:*

Be it known that I, ANTONIN THIOLLIER, of Villeboeuf de Roche la Moliere, Department of the Loire, in the Republic of France, temporarily residing at Denver, Colorado, have invented a new and useful Process of and Apparatus for Extracting Metals from their Ores, which invention is fully set forth in the following specification.

This invention has reference to the extraction of metals from their ores, by means of electricity, by dissolving out the metal from the gangue and precipitating it from the solution.

It has long been known that metals could be deposited from their solutions by electricity, and that the solution from which the metal is deposited on one electrode would renew itself by dissolving metal from a mass at the other electrode as fast as the deposition took place. This principle or action has been utilized for covering objects of metal and other material with a coating or plating of metal, (electroplating,) or for forming castings, (galvanoplating.) It has been proposed to apply it to the extraction of metals from their ores, and processes and apparatus of various kinds have been devised for the purpose. So far as I am aware, however, the application has never been made industrially.

The present invention consists in certain new methods and apparatus for applying the above principle or action, to wit:

It consists, first, in forming the electrode by packing the ore, in a granular or pulverulent condition, about a rod, plate, or other body of a non-corrodible and conducting material, such as gas-carbon, coke, plumbago, and the like; and, secondly, in mixing the same or a similar material with the ore to increase its conductivity.

In attempts heretofore made the ore has been placed around a cage of platinum, and the latter has been rotated with a view of bringing every metallic particle in the ore in contact with the cage. In the present invention the mass of ore is itself conductive, and it is unnecessary to have direct contact between the metallic particles and the conducting body of the electrode. Moreover, the corrosion, and consequent destruction, of the body of the electrode, which takes place when of platinum, is avoided by the use of a non-corrodible material, such as those mentioned, and the detrimental effects attending agitation of the solution are avoided.

The invention consists, thirdly, in placing the ore in upright cases having open-work, perforate, or porous walls, and arranging the opposing electrodes between the said cases; fourthly, in a special arrangement of conductors and connected conductors; and, fifthly, in the combination, with the electrodes which receive the deposit, of receptacles—such as gutters or the like—for catching the same.

The sixth part of the invention relates to a special mode of proceeding, whereby the metal is recovered in the state of oxide.

Heretofore in all attempts to extract metals from their ores by electrolysis the ore is placed around or in contact with the positive electrode—*i. e.*, the electrode connected with the positive pole of the generator of electricity—and is recovered in a metallic state at the negative electrode. In accordance with this sixth part of the present invention the operation is reversed. The ore is placed at or forms part of the negative electrode, and the metal is collected in the form of oxide on the positive. To carry out this method of operation a special electrolyte is used, to wit: the solution of a salt (ordinarily an alkaline salt) whereof the base forms, with the metal to be recovered, a soluble compound having the portion which contains the metal electro-negative. Thus, for example, in the case of gold, a solution of sodium chloride is or may be employed. The soda attacks and unites with the gold, forming aurate of soda, which dissolves. The auric acid or auric oxide in this compound, being electro-negative, goes to the positive electrode when electrolysis takes place, and is there deposited.

The seventh part of the invention consists in the use of electrolytes of alkaline solutions, particularly the caustic alkaline and ammoniacal solutions.

The invention further comprises certain other features of novelty, as hereinafter specified.

The accompanying drawings, which form a part of this specification, illustrate an electrolytic cell constructed in accordance with the invention, Figure 1 being a vertical longitudinal section, Fig. 2 a cross-section, and Fig. 3 a plan, of the said cell.

A is the containing-vessel or tank for the electrolytic solution. It can be made of metal, provided it is insulated, and is made with non-corrodible lining or coating, but is preferably made of wood and lined with lead, or, better, with rubber or gutta-percha, as thus all loss of electricity and of liquids is avoided.

The boxes or receptacles B for the ore are preferably made of wood, and have the sides perforated; but vessels of any non-corrodible material, with open-work, perforate, or porous walls, may be used—for example, brackets of wicker-work, casings of perforated gutta-percha, hard or soft rubber, of perforated sheet-iron, or other metal, enameled, covered with varnish, paint, or a layer of rubber or gutta-percha, or otherwise protected. In case the ore is reduced very fine the receptacles are lined with cloth or felt, which will retain the ore, while permitting free access of the liquid forming the bath. It is well, however, to avoid the use of this porous lining, if possible, even if some of the ore does fall to the bottom of the tank or containing-vessel A, because its use entails a waste of electrical energy. To permit the ready filling and emptying of the ore-receptacles B, one of the larger sides is made removable by well-known or suitable means. Ears or other handles are provided to facilitate removal of the ore-receptacles, with their contents, from the tank A. The ore-receptacles are supported by the slats or bars C in the containing-vessel or tank A, above the bottom of the latter, so as to leave beneath said receptacles a space to receive any ore which may escape from the receptacles B, and also to contain the heating-coil D, which may be an ordinary system of steam-pipes or other suitable heating apparatus. In filling the ore-receptacles the ore, reduced to a pulverulent or granular condition, so that the metallic particles therein may be wet by the electrolytic liquid or solution in the vessel A, is packed in said receptacles, around one or more conducting rods or plates or masses, E, of non-corrodible conducting material, such as gas-carbon, plumbago, coke, and the like. A composition of plumbago (ninety per cent.) and clay (ten per cent.) answers well. In one of the ore-receptacles shown in Figs. 2 and 3 there are three separate rods E; but in the other, which also contains three rods E, the latter are connected by cross-pieces. Other dispositions could be made.

E' is the body of the ore. When the ore is not itself sufficiently conductive, non-corrodible conducting material—such as coke or plumbago—is mixed therewith. After the metal is exhausted from the ore the material is recovered and reused. The pieces, being larger than the particles of ore, are readily separated therefrom.

Between the ore-receptacles are placed the opposing or collecting electrodes F. When the ore is made to form the soluble positive electrode the collecting-electrodes may be plates of copper or other suitable metal; but when the ore forms the soluble negative electrode they would, if of copper, be dissolved in the bath, and therefore in that case they are made of carbon or other non-corrodible material.

Beneath each collecting-electrode, and supported by the slats or bars C, is a gutter, G, for catching any deposit which may not adhere to the electrodes. These gutters may be of metal or wood, or of other material, conducting or non-conducting, but of course non-corrodible under the conditions in which the gutters are to be used.

The rods or cores E are connected with a conducting-frame, H, preferably of copper, which is insulated from surrounding objects by which communication is established between the electrodes E E' and the proper pole of the generator of electricity. The electrodes F are connected with and suspended by a similar frame, I, which is connected with the opposite pole of the generator.

The bath or electrolytic solution may be variously constituted according to the metal to be recovered and ore to be treated. Acids, salts, or bases may be used. Alkaline solutions almost saturated, and particularly the caustic alkaline solutions, are, however, of almost universal application, and possess important advantages in that they readily attack the most difficult ores, and that they form, with the metals, compounds easily decomposed by electricity. Ammonia is specially advantageous in many instances, as the metallic compounds simply go into solution, from which they are precipitated with greater facility. To prevent the escape of the fumes the electrolytic cells or tanks A, with their contents, may be provided with close-fitting covers—such as a hydraulic cover—and after electro-deposition is complete the solution can be run into close tanks and the ammonia-gas driven off by pumps and condensers. In many cases a solution of ammonium carbonate, instead of the caustic-ammonia solution, may be employed, and its use is not attended with the inconvenience and loss arising from the volatilization of the ammonia.

The general mode of proceeding is as follows: The receptacles B, containing the rods E and conducting-body of the ore E', and the opposing electrodes F having been placed in position, the containing-vessel or tank A is filled to a level above the top of the ore with the electrolytic liquid or solution which has been selected, and the frames H I having been connected with opposite poles of the electric generator, (an electrical machine, a secondary battery, or a primary galvanic battery,) the current is passed through the cell. If the electrodes E E' are connected with the negative pole of the generator, an oxide of the metal will be deposited on the positive electrodes, more or less falling into the gutters G. The dissolution of the soluble negative electrode and the deposition of the oxide on the positive electrode have been proved by numerous experiments. If the electrodes E E' are connected with the positive pole, the metal will be precipitated in a massive or in a pulverulent condition on the negative collecting-electrodes F. If heat is required or is deemed advantageous to the operation, steam is allowed to circulate through the coil D. After the metal has been all extracted from the ore, which can be ascertained by removing a portion from the ore-receptacles, the electric circuit is broken, and the ore-receptacles are lifted above the containing-vessel or tank A and allowed to drain. After draining, the receptacles are emptied and filled with fresh ore. The depleted ore is either thrown away, or, if it still contain valuable matters, it is subjected to further treatment by means of electricity or otherwise. The tank is emptied of the liquor, which may be saved for reuse, and the deposited oxide or metal is scraped or otherwise removed from the collecting-electrodes F, and is collected from the gutters G. It may, after recovery, be refined in any known or suitable way. Such treatment, as it forms no part of this invention, need not be here described. It is not necessary to empty the containing-vessel or tank A of the electrolytic solution, nor to collect the deposit from the electrodes F and gutters G at each filling of the ore-receptacles B.

In order to give more definite instructions as to the strength and character of the electrolytic solutions, and the strength of current and the time of treatment, which varies from a few hours to several days, a brief resumé will be given of the particular treatment adapted for different ores, it being assumed that the interior dimensions of the ore-receptacles are in horizontal section about thirty-five by ten centimeters, and in depth about sixty centimeters, and that the collecting-electrodes are about two centimeters from the ore in the receptacles B.

With a dynamo-electric-machine of fifteen horse-power, fifty cells containing each forty pairs of electrodes and two tons of ore can ordinarily be treated at once. In the case of ores containing metals combined with the non-metals—such as sulphur, arsenic, tellurium, &c.—a long treatment is required, because a part of the electric force is expended in the production of oxygen to unite with these materials in the formation of soluble salts, which, in the excess of hydrogen which is given off at the negative pole, prevents the regular deposit of the metal.

*Ores of gold, silver, or platinum.*—When only one metal is contained in the ore, and this is in a native state, the ore preferably forms the positive electrodes of the cell. For silver alone a nearly-saturated solution of a sulphate or nitrate—say sodium sulphate or sodium nitrate—can be used with good effect. A nearly-saturated solution of common salt (sodium chloride) may be used; but in such case it is advantageous to heat the bath nearly to the boiling-point. In no case should the temperature be raised so high as to produce ebullition, since agitation interferes with the operation of the cell. A cyanide solution may be used; but its cost is too great for ordinary purposes. The bath to be preferred to all others is, however, a concentrated solution of ammonia, or, in default of this, a solution of ammonium carbonate. For gold alone solutions of the sulphates, nitrates, soluble cyanides, &c., may be used. If a salt is to be used, a solution of sodium chloride is preferred; but the most advantageous bath is a concentrated solution of caustic soda or potash. For platinum alone the liquids above indicated for gold may be used. The common-salt solution is preferred. When the ore contains two or more of the metals, a bath adapted to both or all—preferably a common-salt solution—is used. The metals are collected together and parted by any suitable means.

*Ore containing silver chloride.*—The best bath is a solution of ammonia, and after that a solution of ammonium carbonate. A hot and strong solution of common salt gives excellent results. The cyanide of potassium would be useful if not so dear.

*Ore containing silver sulphide.*—The ammonia solution is preferable; but a hot solution of common salt is advantageous.

*Ore containing gold telluride.*—A common-salt solution may be used. The dissolution is a little slow; but the gold is recovered in a metallic state. A solution of potassium cyanide may also be used. In all the above the ore is to be placed at the positive pole of the cell, and unless otherwise indicated such is the case in the following example. The telluride ore can be placed at the negative pole of the cell, a common-salt solution being used. The soda rapidly attacks the telluride; the gold is attracted to the positive pole as auric acid, and is there deposited. It is collected and melted with a little carbon and borax to have the pure gold.

*Ores containing both gold and silver, together with compounds of lead, copper, and iron, with the non-metals, sulphur, chlorine, arsenic, tellurium, oxygen, &c.*—A hot solution of sodium chloride (common salt) is preferably employed. With a moderate current the gold, silver, copper, and lead collect at the negative pole. The iron falls to the bottom of the containing-vessel or tank as oxide. This case is one of the most complicated that presents itself. A preliminary careful roasting of the ore hastens the operation. Other solutions can be used. For example, a solution of potash can first be used to extract the gold and the lead, (which can then be separated by cupellation,) and then an ammonia solution to collect the silver and copper, which can be separated by means of a solution of copper sulphate by a well-known process.

*Zinc ores.*—The ores, calamines, or blendes are preferably subjected to a preliminary roasting. By making these ores the positive electrode, solutions of the alkaline and other salts, or solvents of zinc may be used. The solution may be nearly saturated. The salt preferred is that which is most easily decomposed by the electric current and which costs least; but the use of salts is attended with certain inconveniences. If non-calcareous blende previously roasted is heated, the saline solution will dissolve a little iron or lead, which alters the quality of zinc obtained. If calamine is treated, whether roasted or not, iron and lead are dissolved, and also a large quantity of lime, which is carried to the negative pole and interferes with the regular deposit of zinc. The lime remains suspended in the bath or precipitates to the bottom of the containing-vessel or tank and interferes with the operation. The use of alkaline baths, particularly those of ammonia, is preferred. The ammonia solution readily dissolves the zinc oxide or carbonate, (if roasted or unroasted calamine is used,) and the compound formed is decomposed by the electricity with a small expenditure of energy. The ammonium-carbonate solution may also be used with excellent results. With soda and potash the yield is slightly less than with ammonia; but the inconveniences attending the use of the volatile alkali are avoided. With the basic alkaline solutions the oxides and carbonates of zinc are alone attacked, the iron, lead, lime, silver, &c., remain in the gangue, and if in paying quantities they can be collected by electricity or other suitable means. The zinc thus obtained is much more supple and malleable than the zinc obtained in the ordinary way by distillation.

*Ores of lead.*—The electrolytic process is hardly sufficiently economical for the treatment with these ores; but if it is desired to use it for the extraction of the metal therefrom a solution of sodium chloride or lead chloride, heated almost to ebullition, is or may be employed. Lead and silver are collected; but they are contaminated with zinc and copper, if the ore contain these metals. The use of caustic soda offers great advantages, since the lead is recovered in a very pure state, contaminated, if at all, only with a little zinc, which is easily separable by known means. The residue contains the silver and copper, which can be recovered by a bath of ammonia, or less advantageously by a saline solution.

*Parting of silver from lead.*—The argentiferous lead is melted with a small quantity of zinc in the usual way. The alloy of lead, silver, and zinc which collects on top is put into the ore-receptacles of the electrolytic apparatus, and a solution of zinc sulphate, or, still better, of ammonium carbonate or ammonia, is used as the bath. The zinc only dissolves and deposits in a state of purity at the negative electrode. The lead and silver are separated by cupellation. The expense of distillation and loss of zinc and silver are thus avoided.

*Ores of antimony.*—These are ordinarily the oxides and sulphides. Either variety may be treated with a bath of any salt whereof the acid forms with antimony a soluble compound; but special advantages attend the use of potash, (not soda, since this forms with antimony a salt but little soluble,) the solution being heated nearly to boiling—say to 80° centigrade.

*Ores of mercury.*—The bath may be a solution of the sulphate, nitrate, or bichloride of mercury. The mercurial salts being readily decomposed by electricity, there is no special advantage in the use of the alkalies, although they may be employed. Cinnabar is of course the ore most commonly employed. By this method all dangers attending the ordinary process of extracting mercury are avoided.

*Copper ores.*—These ores are divisible into three classes, to wit: first, the oxides and carbonates; second, the simple and compound sulphides; third, the gray coppers containing arsenic or antimony. The second class is or may be reduced to the former by roasting. With both the first and second class, saline baths may be used; but the yield is small. An ammonia or ammonium-carbonate solution gives the best result. Ores of the third class are roasted at a low temperature, so as not to volatilize the antimony. The roasted ore is treated with a potash solution, as described for ores of antimony. The latter metal is collected. The residue is then treated in a bath of ammonia or ammonium carbonate, and the silver and copper are collected together. They can be separated by means of a sulphate-of-copper solution, or by other known or suitable means.

*Ores of nickel and cobalt.*—Of these ores there are three classes, to wit: First, those of New Caledonia, which are double silicates hydrated of nickel and magnesium. Second, those which were worked before the discovery of the New Caledonia deposit, and of which the working has since been abandoned. They contain ordinary nickel alloyed with cobalt, and often copper, being those often combined with sulphur and arsenic. Third, those oxides of nickel and cobalt which have not heretofore been worked, and of which there are large quantities in New Caledonia and various parts of the Pyrenees. Ore of the first class is roasted with a little carbon to expel the water of crystallization and reduce the nickel to a metallic state. It is then treated electrically, using a saline bath, or preferably one of ammonia or carbonate of ammonia. Ore of the second class is roasted preliminarily to expel the largest part of the sulphur and arsenic. The roasted ore is treated with a bath of potash, or, better, soda solution. The cobalt alone dissolves and deposits on the negative electrodes. The residue is treated with a bath of ammonia or carbonate-of-ammonium solution, which extracts the nickel and copper. The copper may be separated by a bath of copper-sulphate solution and a feeble electric current. The nickel may be cast, or purified by further treatment in a bath of ammonia. Ores of the third class are melted with carbon in a reverberatory or other suitable furnace, so as to remove the greater part of the manganese. The product—an alloy of cobalt, nickel, and manganese—is electrically treated with a soda bath to extract the cobalt, and the residuum with an ammonia bath to recover the nickel.

*Iron ores.*—Of course the electrolytic treatment will not compete with the economical treatments now in use. It may, however, be usefully employed where there is a large available source of power close to the mine. There are, for example, in the Pyrenees and the Alps large deposits of ore containing carbonates of iron and calcium, with unused waterfalls near by. With this ore a bath of sodium or iron chloride solution can be used. A deposit of chemically-pure iron is obtained on the collecting-plates. Lime falls to the bottom of the tank or containing-vessel.

Modifications may be made in the details without departing from the spirit of the invention, and portions thereof may be separately used.

Having now fully described my said invention and the manner of carrying the same into effect, what I claim is—

1. A cell for recovering metals from their ores, constructed and operating substantially as described, said cell comprising a vessel containing the electrolytic bath, a receptacle or receptacles with perforate or porous walls, immersed in said bath and containing a conducting-body of ore packed around a rod or plate of non-corrodible carbonaceous material, and one or more opposing electrodes, as set forth.

2. In the extraction of metals from their ores by means of electricity, the improvement consisting in mixing with the ore a non-corrodible conducting material in a granular or pulverulent condition, substantially as described.

3. A soluble electrode for an electrolytic cell, comprising a body or mass of granular or pulverulent ore mixed with non-corrodible conducting material, and packed around a rod or plate of similar material, substantially as described.

4. The combination, with the collecting-electrodes of an electrolytic cell, of the gutters for catching the deposit which does not adhere to said electrodes, substantially as described.

5. The combination of the containing-vessel, the soluble electrodes, the opposing or collecting electrodes, the gutters for catching the deposit which does not adhere to said collecting-electrodes, and the heating-coil in the bottom of said vessel, substantially as described.

6. The method of extracting metals by immersing the prepared material containing the metal in a suitable electrolytic liquid, passing a current of electricity through the said liquid from an opposing electrode to said material, and collecting the metal as oxide at said opposing electrode, substantially as described.

7. In combination with an electro-generator, a receptacle for conductively-prepared ore or other material containing metal to be recovered, having attachments for the negative and positive polar conductors of the electro-generator, arranged, as described, in electrical communication with the mass of conductive ore by means of the electrolytic solution, whereby reduction is effected when the current is passed, substantially as described.

8. An electrolytic cell comprising one or more soluble electrodes of conductively-prepared ore packed in receptacles with perforate or porous walls, and one or more collecting-electrodes, and provided with an alkaline solution — as an electrolytic bath — substantially as described.

In testimony whereof I have signed this specification in the presence of two subscribing witnesses.

A. THIOLLIER.

Witnesses:
B. F. LEE,
CHAS. A. DE CHAMBURY.